US008925623B2

(12) United States Patent
Sauer et al.

(10) Patent No.: US 8,925,623 B2
(45) Date of Patent: Jan. 6, 2015

(54) SCALEABLE PARALLEL FLOW MICRO-CHANNEL HEAT EXCHANGER AND METHOD FOR MANUFACTURING SAME (71) Applicant: Raytheon Company, Waltham, MA (US)

(72) Inventors: Rohn Sauer, Encino, CA (US); Scott Johnson, Torrance, CA (US); Ediberto R. Garcia, Westchester, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/660,963

(22) Filed: Oct. 25, 2012

(65) Prior Publication Data

US 2013/0068436 A1 Mar. 21, 2013

Related U.S. Application Data (62) Division of application No. 12/111,880, filed on Apr. 29, 2008, now Pat. No. 8,302,671.

(51) Int. Cl.
*F28F 9/02* (2006.01)
*B23P 15/26* (2006.01)
*B23K 1/00* (2006.01)
*F28B 9/02* (2006.01)
*F28F 1/00* (2006.01)
*H05K 7/20* (2006.01)

(52) U.S. Cl.
CPC .............. *B23P 15/26* (2013.01); *B23K 1/0012* (2013.01); *F28B 9/02* (2013.01); *F28F 1/00* (2013.01); *B23K 2201/14* (2013.01)
USPC ........................ 165/75; 165/80.4; 29/890.052

(58) Field of Classification Search
CPC .......... H05K 7/20218; H05K 7/20254; H05K 7/20263; H05K 7/20272; H05K 7/20281; F28F 9/0256; F28F 9/02; F28F 9/0224; B23K 2201/14; H01L 23/473
USPC ..................... 165/80.4, 104.33, 11.1, 74, 75; 29/890.03, 890.052; 361/699, 715
See application file for complete search history.

(56) References Cited

U.S. PATENT DOCUMENTS

| 3,481,393 | A |   | 12/1969 | Chu |   |
|---|---|---|---|---|---|
| 4,748,495 | A | * | 5/1988 | Kucharek | 257/713 |
| 4,962,444 | A |   | 10/1990 | Niggemann |   |
| 5,016,090 | A |   | 5/1991 | Galyon et al. |   |
| 5,070,936 | A | * | 12/1991 | Carroll et al. | 165/80.4 |
| 5,294,830 | A | * | 3/1994 | Young et al. | 257/714 |
| 5,309,319 | A |   | 5/1994 | Messina |   |
| 5,420,753 | A | * | 5/1995 | Akamatsu et al. | 361/719 |
| 5,774,334 | A | * | 6/1998 | Kawamura et al. | 361/699 |
| 6,719,039 | B2 | * | 4/2004 | Calaman et al. | 165/80.4 |
| 6,778,393 | B2 | * | 8/2004 | Messina et al. | 361/699 |

(Continued)

*Primary Examiner* — Tho V Duong (74) *Attorney, Agent, or Firm* — Christie, Parker & Hale, LLP (57) ABSTRACT Provided is a heat exchanger, heat sink or coldwall having a machined manifold for receiving a plurality of individual, modular micro-channel heat exchanger elements. The manifold further includes a parallel flow network or flow distribution network for distributing a cooling fluid uniformly to all micro-channel heat exchanger elements. Each micro-channel heat exchanger element is individually manufactured and tested prior to integration with the manifold. The design of the micro-channel heat exchanger elements may include a straight fin, a high density fin, lanced offset fin, and perforated offset layers fin configurations.

7 Claims, 7 Drawing Sheets

(56) References Cited

U.S. PATENT DOCUMENTS

| | | |
|---|---|---|
| 7,032,651 B2 | 4/2006 | Winslow et al. |
| 7,190,580 B2 * | 3/2007 | Bezama et al. ............... 361/699 |
| 7,201,217 B2 | 4/2007 | Johnson et al. |
| 7,298,618 B2 | 11/2007 | Campbell et al. |
| 7,353,859 B2 | 4/2008 | Stevanovic et al. |
| 7,427,566 B2 | 9/2008 | Durocher et al. |
| 2003/0066634 A1 | 4/2003 | Valenzuela et al. |
| 2004/0060689 A1 * | 4/2004 | Pfeifer et al. ................. 165/80.4 |
| 2004/0206477 A1 * | 10/2004 | Kenny et al. .................. 165/80.4 |
| 2007/0050980 A1 * | 3/2007 | Vetter ...................... 29/890.043 |
| 2008/0301941 A1 * | 12/2008 | Anderson et al. .......... 29/890.03 |

* cited by examiner

SCALEABLE PARALLEL FLOW MICRO-CHANNEL HEAT EXCHANGER AND METHOD FOR MANUFACTURING SAME

CROSS-REFERENCE TO RELATED APPLICATION(S)

This application is a divisional of U.S. patent application Ser. No. 12/111,880, entitled SCALEABLE PARALLEL FLOW MICRO-CHANNEL HEAT EXCHANGER AND METHOD FOR MANUFACTURING SAME, filed Apr. 29, 2008, the entire contents of which are incorporated herein by reference.

STATEMENT REGARDING FEDERALLY SPONSORED RESEARCH OR DEVELOPMENT

This invention was made with Government support under Contract No. F 19628-00-C-0100 awarded by the Department of the Air Force. The Government has certain rights in this invention.

FIELD OF THE INVENTION

This invention relates generally to heat sinks or heat exchangers. More particularly, this invention relates to a heat exchanger having multiple, replaceable micro-channel heat exchanger elements integrated into an array with liquid coolant supplied to each heat exchanger element simultaneously by a parallel distribution manifold.

BACKGROUND

An integral requirement of efficient electrical component design is the need to package a large number of components in a relatively small volume. Most if not all of the components in high density component packages, however, typically generate heat which cumulatively exceeds acceptable operating levels for the electrical components of interest. As such, it is necessary to cool these areas of elevated heat, or stated differently, it is necessary to cool all of these elements to substantially the same temperature at the same time.

Often times, liquid flow heat exchangers with micro-channels are used to transfer heat away from the heat sources (i.e. the electrical components). It is possible to manufacture compact, efficient micro-channel heat exchangers or cold walls for this purpose, such as the heat exchangers disclosed in U.S. Pat. No. 7,032,657 B2 to Winslow et al on Apr. 25, 2006, and in U.S. Pat. No. 7,201,217 B2 issued to Johnson et al on Apr. 10, 2007. However, such heat exchangers require as many as five or perhaps more levels of brazing during the manufacturing process. Multiple brazing steps, in addition to the performance of complex machining operations, increase significantly the overall cost of manufacturing. Moreover, heat exchangers of this design are limited in physical size (typically 24 inches×24 inches) by the very complexity of the brazing operation, with the extended brazed surface being the most susceptible to failure. Small braze failures, often discovered after the final machining operations have been performed, can result in expensive scrapped hardware.

Further, with conventional designs and those disclosed in the prior art cited above, precise and uniform temperature control can be challenging. Temperature control can be achieved across the surface of a cold plate by controlling the pressure drop across each heat exchanger element. This approach, however, requires providing input and output orifices of pre-selected dimensions at each heat exchanger element. Tight dimensional control of the input and output orifices cannot be incorporated into the designs of the prior art because the larger scale brazing operations required for heat exchanger assembly will plug or distort the orifices, thereby causing highly undesirable non-uniform cooling across the face plate. Consequently, there is an unacceptably high scrap rate as a result of post-manufacturing thermal testing failures. Finally, small braze joint leaks can occur near electrical through-holes in the assembly. These leaks are difficult to locate and repair.

An important quality control element of heat exchanger manufacturing is the thermal testing and characterization of the heat exchanger once it is assembled. Monolithic designs consisting of hundreds of micro-channel cores, as might be required for a phased array radar, cannot be thermally verified in a cost effective manner.

Hence, there is a need for a multi-element, modular micro-channel heat exchanger, and a method of manufacturing the same, for cold wall applications of any size that overcome one or more of the drawbacks identified above.

SUMMARY

A heat exchanger or heat sink, according to the present disclosure, is provided having a manifold, a plurality of modular or interchangeable micro-channel heat exchanger elements, a parallel flow coolant supply system and a cover for sealing one side of the manifold. A method for separately manufacturing components of the heat exchanger, and assembling said components for final integration and testing is also disclosed.

In particular, and by way of example only, according to an embodiment, provided is a heat exchanger including: a manifold having a first side and a second side, the first side including a plurality of enclosures and the second side having a parallel flow network in fluid communication with each of the plurality of enclosures; a plurality of modular micro-channel heat exchanger elements, each element fastened within an enclosure of the first side of the manifold; and a cover structured and arranged to seal the second side of the manifold.

In another embodiment provided is a method of manufacturing a heat exchanger, including: forming a first side of a manifold to define a plurality of individual pockets and a second side of the manifold to define a parallel flow network; fabricating a plurality of modular, interchangeable micro-channel heat exchanger elements; securing a cover to the second side of the manifold; and removably integrating the plurality of modular, interchangeable micro-channel heat exchanger elements into the plurality of individual pockets defined in the first side of the manifold.

In yet another embodiment, provided is a method for removing heat generated by electrical components integrated into a compact volume, the method including: passing a fluid through a manifold positioned in close proximity to the electrical components, the manifold having a first side and a second side, wherein a parallel flow network is formed into the second side, and a cover is structured and arranged to seal the second side of the manifold; directing the fluid simultaneously into and out of a plurality of micro-channel heat exchanger elements, each element fastened within an enclosure of the first side of the manifold; and exiting the fluid out of the manifold to carry the generated heat away from the electrical components.

In still another embodiment, provided is a method of manufacturing a heat exchanger, including: forming a first side of a manifold to accept a plurality of individual element receptacles and a second side of the manifold to define a parallel flow network; fabricating a plurality of micro-channel heat exchanger elements; testing the thermal performance of the each of the plurality of micro-channel heat exchanger elements; scrapping and replacing a micro-channel heat exchanger element rejected during testing; constructing the plurality of individual element receptacles; securing a cover to the second side of the manifold; interfacing each of the plurality of individual element receptacles with the first side of the manifold; and removably integrating the plurality of micro-channel heat exchanger elements into the plurality of individual element receptacles to interface with the parallel flow network.

DETAILED DESCRIPTION

Before proceeding with the detailed description, it should be noted that the present teaching is by way of example, not by limitation. The concepts herein are not limited to use or application with one specific type of heat exchanger. Thus, although the instrumentalities described herein are for the convenience of explanation, shown and described with respect to exemplary embodiments, the principles herein may be equally applied in other types of heat exchangers.

Figure 1:
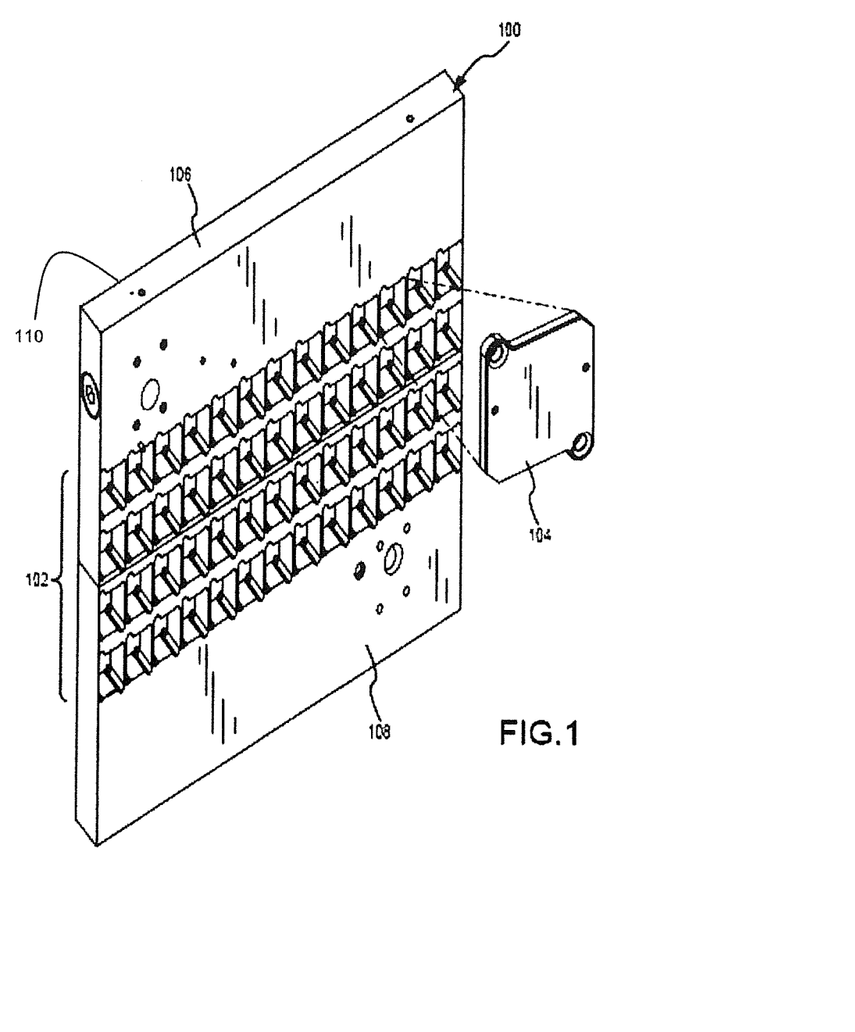
FIG. 1 is a perspective view of a heat exchanger having a plurality of modular micro-channel heat exchanger elements, according to an embodiment.

Referring initially to FIG. 1, a heat exchanger 100 according to the present disclosure is provided. As shown, heat exchanger 100 may include a plurality of modular, interchangeable or replaceable micro-channel heat exchanger elements, of which micro-channel heat exchanger element 104 is shown in an exploded view. As can be appreciated by referring to FIG. 1, each micro-channel heat exchanger element (e.g. element 104) may be an individual, discrete device which is fastened or mounted to and/or within a manifold 106, as discussed in greater detail below. Mounting may be by any of a number of mechanical attachment techniques well known in the art, and the micro-channel heat exchanger elements may be mounted in series. The mounting techniques may be non-permanent e.g. bolts or screws, or in at least one embodiment, may be semi-permanent in nature, e.g. bonding.

In at least one embodiment, micro-channel heat exchanger element 104 is a straight fin heat sink or heat exchanger element, however, micro-channel heat exchanger element 104 may incorporate any of a number of different extended surface area fin configurations. For example, the surface area fin configuration of micro-channel heat exchanger element 104 may be selected from a group consisting of, but not limited to, a straight fin, a high density fin, a lanced offset, and perforated offset layers. In one embodiment, micro-channel heat exchanger element 104 is a three (3) pass high density fin as discussed in greater detail with reference to FIGS. 4 and 5.

Figure 6:
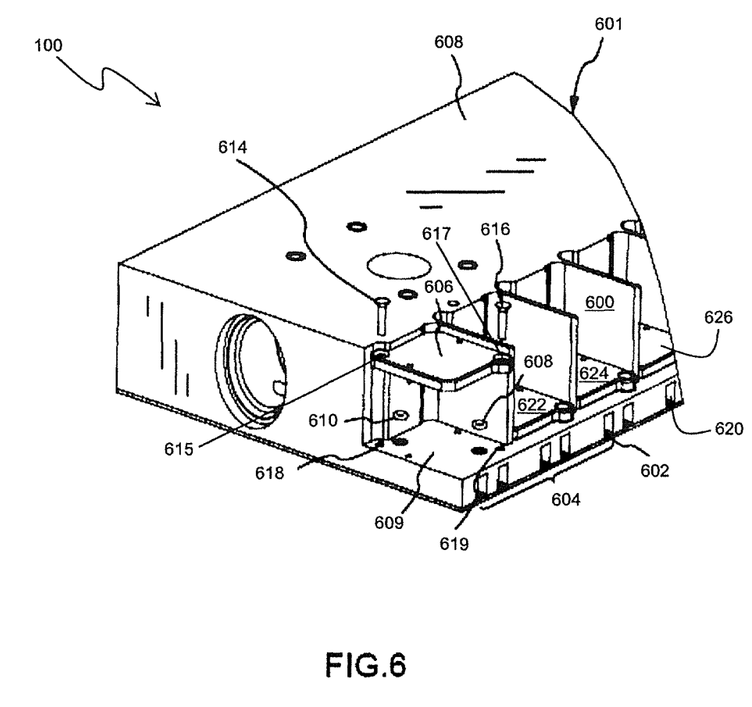
FIG. 6 is a perspective view of the partial assembly of a heat exchanger, according to an embodiment.

Still referring to FIG. 1, heat exchanger 100 includes a manifold 106 with a side 108 having a plurality of enclosures, which in at least one embodiment comprise a plurality 102 of machined pockets for receiving micro-channel heat exchanger elements (e.g. element 104). Cross-referencing for a moment with FIG. 6, the nature of the pockets, of which pocket 600 in FIG. 6 is exemplary, is more clearly defined. It can be appreciated that manifold 106 may include a machined pocket or opening for each micro-channel heat exchanger element which comprises the plurality of micro-channel heat exchanger elements. Further, manifold 106 may include pockets (not shown) machined into the manifold 106 which are designed to reduce the overall weight of the manifold. In one embodiment, manifold 106 has supply and return gun bored manifolds.

As shown in FIG. 6, a manifold 601 includes a side 602, into which is machined a parallel flow network 604 for distributing a cooling fluid (not shown) throughout the manifold 601, which is to say throughout the plurality of micro-channel heat exchanger pockets (e.g. pocket 600) and elements (606 in FIG. 6). The network 604 is the primary coolant distribution channel for each micro-channel heat exchanger element. By way of example, in one embodiment, the network 604 includes a plurality of generally parallel channels disposed in side 602. The channels are structured and arranged to provide a parallel supply path for a coolant under a preselected system pressure from a coolant reservoir (not shown), simultaneously, to each of the micro-channel heat exchanger elements, e.g. element 606 in FIG. 6; and then from a parallel return path to a secondary cooling system or heat sink (not shown). The secondary cooling system extracts the heat from the coolant and then returns it under system pressure to the heat exchanger manifold. Network 604 is routed between and/or below the plurality 606, 622, 624, 626 of micro-channel heat exchanger elements. In at least one embodiment, the parallel flow network 604 delivers similar characteristic fluid or coolant in parallel to each individual micro-channel heat exchanger element (of which element 104 in FIG. 1 and element 606 in FIG. 6 are exemplary) at the same time.

Figure 3:
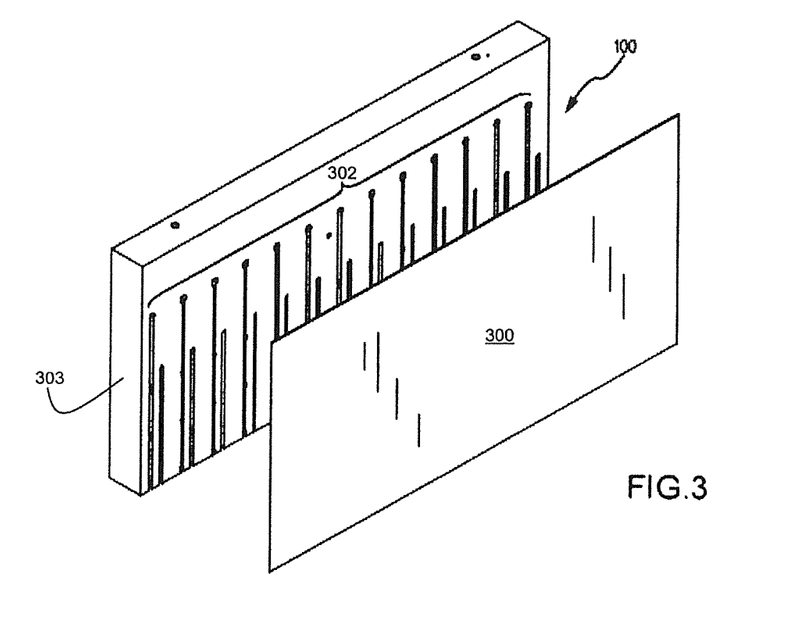
FIG. 3 is a partial perspective view of the manifold side of a heat exchanger and cover, according to an embodiment

Referring for a moment to FIG. 3, a parallel flow network such as network 604 of FIG. 6 is shown in greater detail. Distribution and return paths or channels which constitute a flow network, e.g. network 302, are machined into a manifold 303. As shown in FIG. 3, the heat exchanger 100 also includes a cover 300 for covering and sealing a side (e.g. side 602 in FIG. 6 and side 110 in FIG. 1) of heat exchanger 100. When assembled, cover 300 covers the plurality 302 of machined grooves, pathways or channels which define the parallel flow network 604 (FIG. 6). As is discussed in greater detail below, cover 300 is brazed to a manifold 303, which may be an eggcrate manifold. In one embodiment, cover 300 and manifold 303 are aluminum, which may be 6061 T6 aluminum, by way of example; although, other flexible, semi-rigid or rigid materials may also be used.

Figure 4:
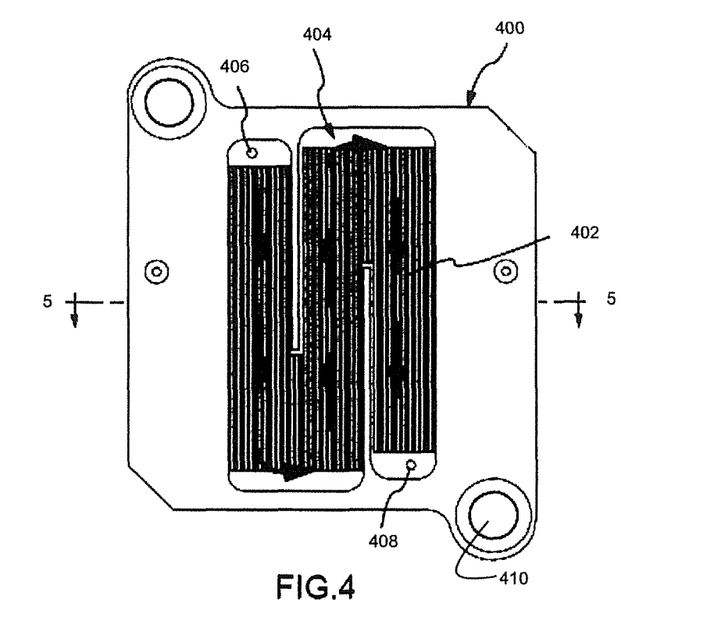
FIG. 4 is a plan view of a micro-channel heat exchanger element, according to an embodiment.

As can best be appreciated by referring back to FIG. 1, manifold 106 is large enough in cross-sectional area to provide the desired and proper flow distribution required to efficiently cool the plurality of micro-channel heat exchanger elements (e.g. element 104 in FIGS. 1 and 606 in FIG. 6) and hence the electrical components of interest. In one embodiment, heat exchanger 100 is capable of incorporating very large pressure drops within individual micro-channel heat exchanger elements, e.g. element 104. In this manner, coolant flow is evenly distributed thereby providing a substantially constant temperature across the entire manifold 106 or cold-wall surface. For example, in one embodiment, large pressure drops may result in a minimal temperature gradient of 3.degree. C. across substantially the entire surface of the heat exchanger 100. As shown in FIG. 4, a micro-channel heat exchanger (e.g. exchanger 104) may include one or more orifices 406 & 408, which can be incorporated to tailor the flow distribution. Network 106 is thermally isolated from the surrounding environment to prevent excessive heat influx into the input cooling fluid.

Figure 2:
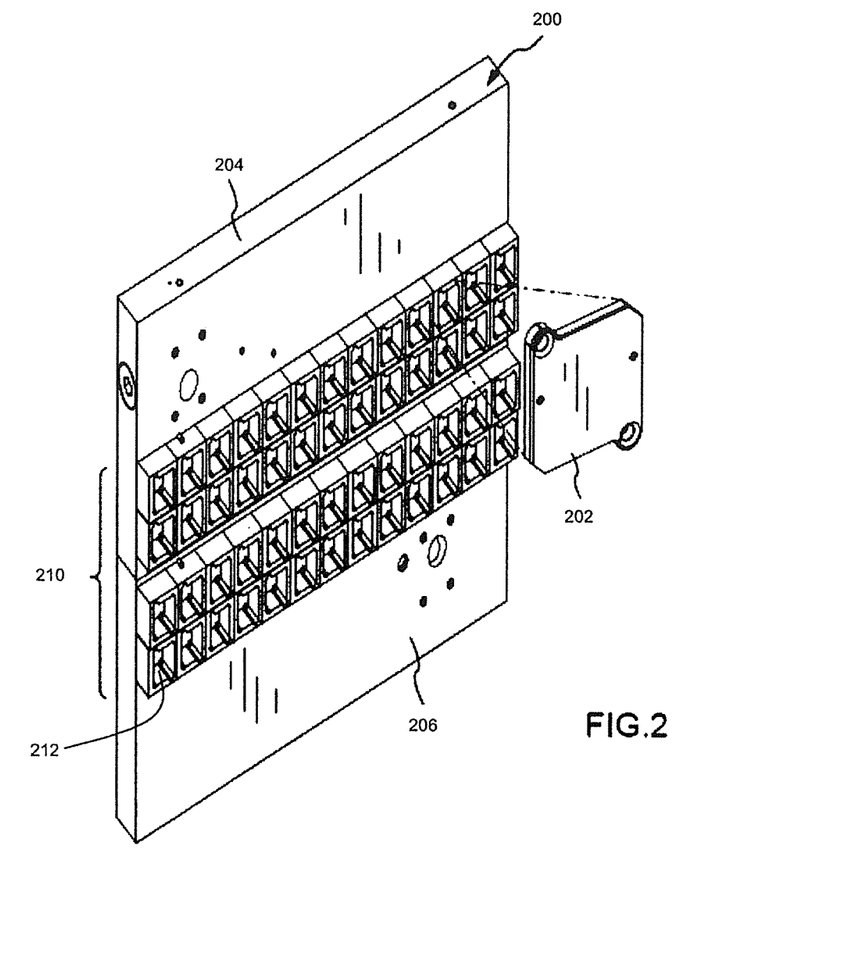
FIG. 2 is a perspective view of a heat exchanger having a plurality of modular micro-channel heat exchanger elements, according to another embodiment.

In yet another embodiment of the present disclosure shown in FIG. 2, a heat exchanger 200 is provided which includes a plurality of micro-channel heat exchanger elements of which micro-channel heat exchanger element 202 is shown in exploded view. Heat exchanger 200 includes a manifold 204 with a side 206 having a plurality of enclosures or receptacles 210 of a preselected configuration, each receptacle, e.g. receptacle 212 being adapted to receive a micro-channel heat exchanger element, e.g. element 202. Each of the receptacles 212, of the embodiment of FIG. 2, is in parallel fluid communication with a parallel flow network such as flow network 604 of FIG. 6, which is also illustrated in greater detail as a plurality of machined grooves or channels, 302, in FIG. 3. As can be appreciated by referring to FIG. 2, an element 202 may be mounted or attached to or within a receptacle 212 via any number of mechanical attachment schemes well known in the art (e.g. bolts, screws, pins, etc.). The element 202 may be mounted within the receptacle 212 to maintain fluid communication with the manifold 204. In yet another embodiment, an element 202 may be mounted or attached directly to a surface or side 206 of the manifold 204.

Figure 5:
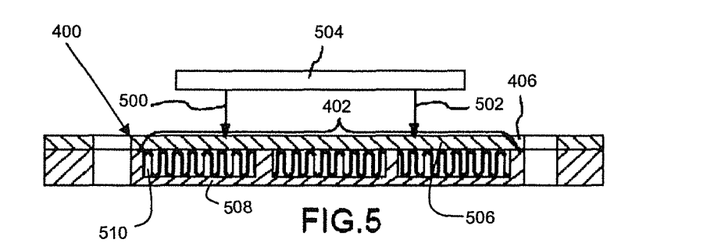
FIG. 5 is a cross-section view of the micro-channel heat exchanger element depicted in FIG. 4.

Referring now to FIGS. 4 and 5, a plan view (FIG. 4) and a cross-sectional view (FIG. 5) of a representative modular, micro-channel heat exchanger element 400 is presented. It can be appreciated that while micro-channel heat exchanger element 400 is representative of the plurality of micro-channel heat exchanger elements provided for in FIGS. 1 and 2, other micro-channel heat exchanger elements may be incorporated without departing from the scope of the present disclosure. As shown in FIG. 4, micro-channel heat exchanger element 400 may include a three-pass, high density fin configuration 402 for yielding the desired pressure drop and temperature gradient. As noted above, the fin configuration may be any one of many to include, but not limited to, a straight fin, a high density fin, a lanced offset, and perforated offset layers. In particular, the combination of fin design, orifice diameter (e.g. 0.025" in at least one design), and the serpentine path 404 defined by fin configuration 402 ensure the desired and required thermal performance. Control of the orifice (406, 408) diameter is critical to maintain desired pressure deltas, and can be achieved by virtue of the unique manufacturing approach disclosed herein.

Still referring to FIGS. 4 and 5, and considering the operation of heat exchanger 100 and micro-channel heat exchanger element 400 in somewhat greater detail, the extended fin surface provided by fin configuration 402 provides substantial heat transfer capability. During operation, heat (represented by arrows 500 and 502 in FIG. 5), passes from an electronic component or module 504, through a brazed cover 506 of element 400. The heat then passes into the fin configuration 402 and is subsequently swept away by the cooling fluid (not shown). The cooling fluid enters micro-channel heat exchanger element 400 via an inlet or inlet port 406 and exits via an outlet or outlet port 408.

If at any time during the operational testing of a heat exchanger (e.g. heat exchanger 100) or during operational use, an element such as element 400 is no longer providing the required heat transfer function, the element 400 may be removed and replaced without having to violate the structural integrity and defined coolant distribution path of the entire heat exchanger 100.

Figure 7:
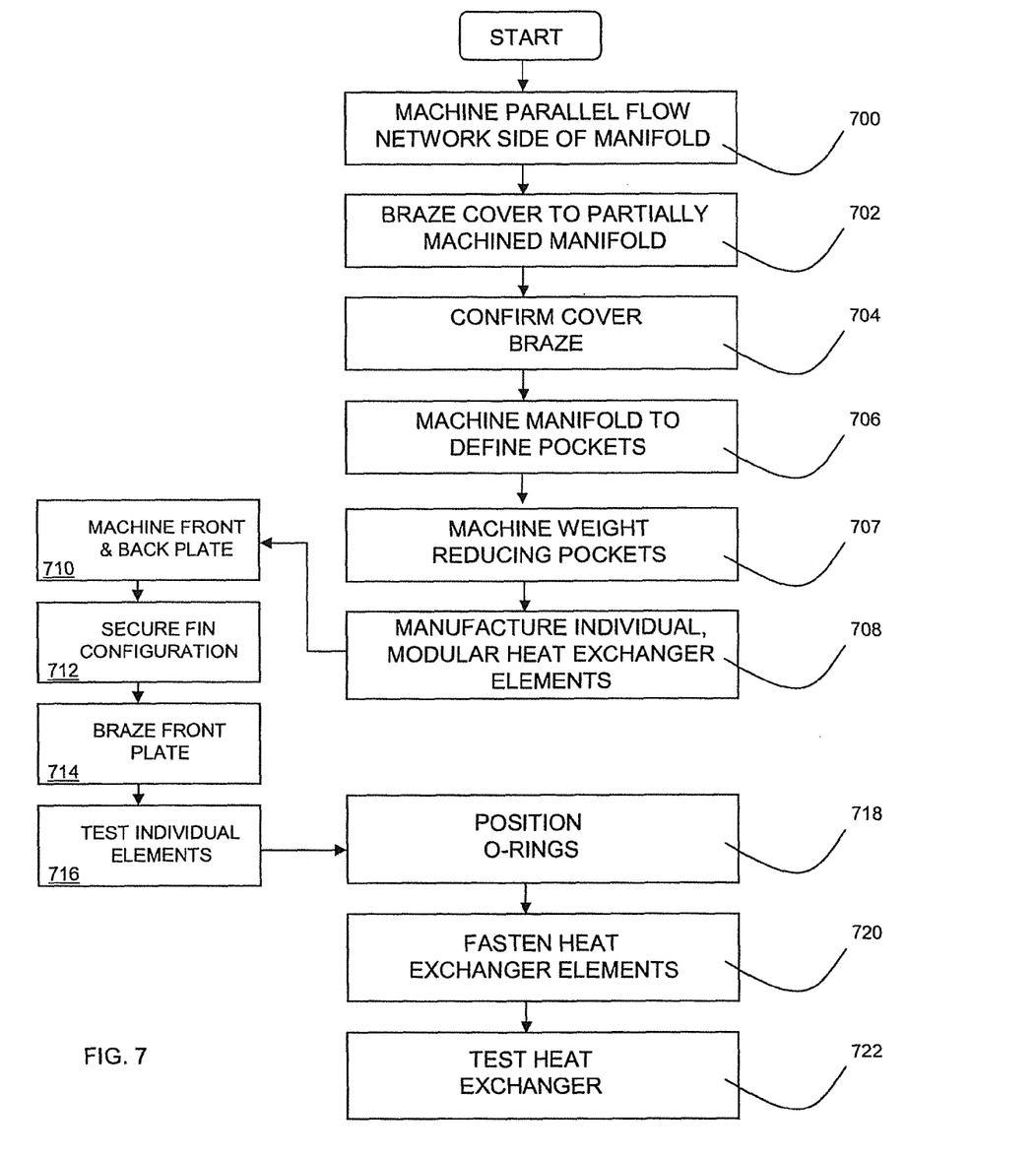
FIG. 7 is a flow diagram of a manufacturing process, according to an embodiment.

Turning now to FIGS. 6 and 7, a method of manufacturing a heat exchanger of the present disclosure is presented. Initially, a side 602 of a manifold 601 is machined (block 700) to define the parallel flow network 604. The size, shape and orientation of individual channels or conduits, e.g. channel 620, are defined to help maintain and control fluid flow throughout the manifold 601. A cover (e.g. cover 300 in FIG. 3) is then brazed to the manifold 601, which is only partially machined at this point, block 702. In this way, the "higher risk" brazing operation, i.e. brazing cover 300 to cover side 602, is performed, and the integrity of the braze is confirmed, block 704, prior to the more complicated machining of side 608. Stated differently, the extremely complex extended surface area brazement is separated from the pocket machining of the manifold 601.

In a subsequent step, block 706, side 608 of manifold 601 is machined to define the individual pockets or spaces, e.g. pocket 600, for receiving micro-channel heat exchanger elements. e.g. element 606. Additionally, pockets may be machined to reduce the overall weight of the system, block 707. In parallel with the machining and brazing of manifold 601, individual micro-channel heat exchanger elements (e.g. element 606) are manufactured, block 708. In general, the micro-channel heat exchanger elements can be manufactured efficiently and inexpensively.

In at least one embodiment of the present disclosure, manufacture of the individual heat exchanger elements includes machining of a front plate 506 and back plate 508 (FIG. 5), to include machining flow control orifices (406 and 408 FIG. 4), mounting holes e.g. hole 410 in FIG. 4, and fin stock recessed areas, e.g. recess 510 in FIG. 5 (block 710). A predetermined fin configuration (e.g. configuration 402 in FIG. 4) is secured within the recesses of the heat exchanger element, block 712, and front plate 506 is brazed to the back plate 508, block 714. Each individual micro-channel heat exchanger element is then individually tested, or bench tested as well, for thermal performance, block 716. By manufacturing and testing the modular micro-channel heat exchanger elements individually, costly scrap and rework of heat exchanger components or entire heat exchangers is avoided.

Once the manufacture of the individual micro-channel heat exchanger elements is complete (block 708) and the braze of a cover over the parallel flow network 604 is completed (block 702), assembly of the heat exchanger, e.g. heat exchanger 100, may begin. As represented in FIG. 6, in one embodiment two O-rings 608 and 610 or similar devices are placed on surface 609 of the eggcrate manifold 601 for each micro-channel heat exchanger element 606, block 718. In at least one embodiment, the O-rings 608, 610 are fluorosilicone. In yet another embodiment, an O-ring, gasket or similar device is not required. When fully assembled, O-rings 608, 610 compress to create a fluid seal.

Micro-channel heat exchanger element 606 is fastened to manifold 601, block 720. Fastening may include any of a number of techniques well known in the art, to include using mechanical fasteners or screws 614 and 616. Locating pins (not shown) may be used to align and position element 606. In at least one embodiment, manifold 601 includes threaded holes 618, 619 for receiving the mechanical fasteners 614, 616. Threaded hole or aperture 618, 619 may have a spiral-lock thread for locking a fastener 614, 616 in place. All modular micro-channel heat exchanger elements are mounted to manifold 601 in substantially the same manner. A final testing of the assembled heat exchanger 100 is performed to verify mechanical integrity, pressure drop and thermal performance, block 722.

Figure 8:
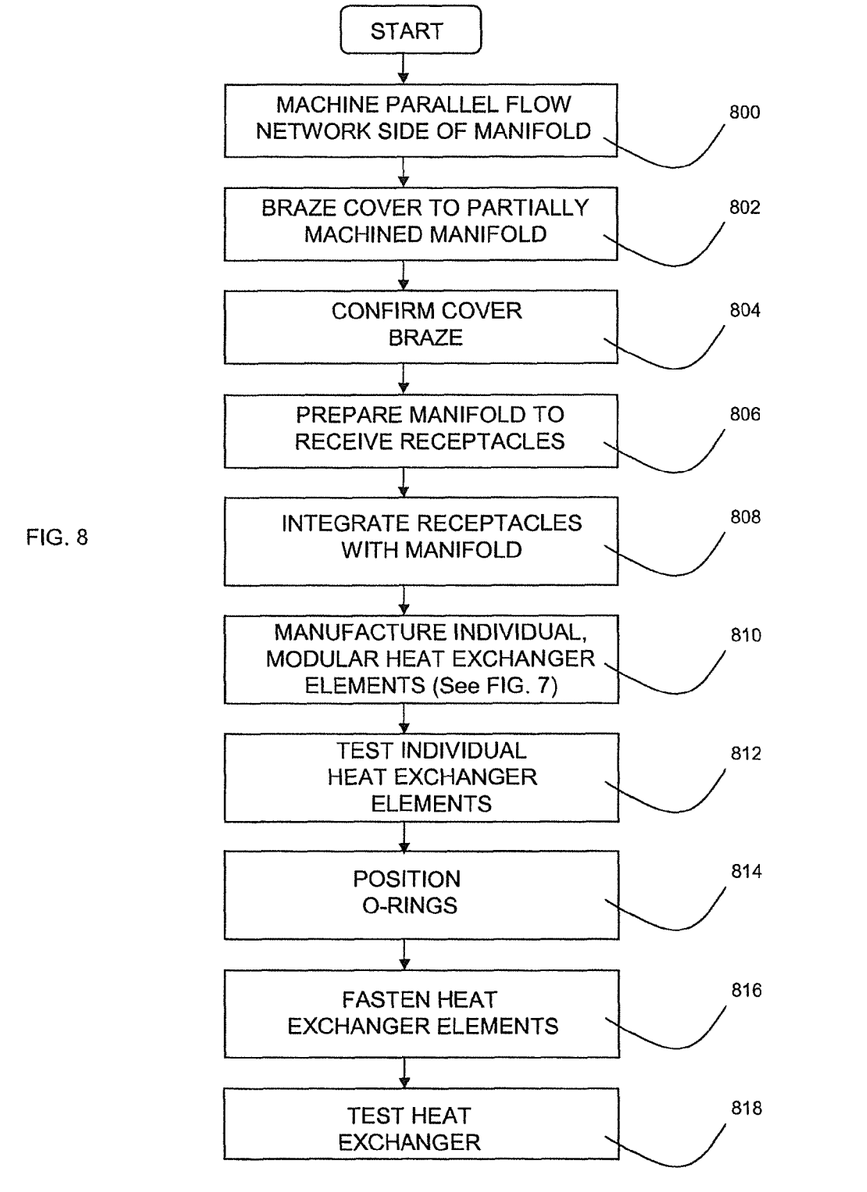
FIG. 8 is a flow diagram of a manufacturing process according to another embodiment.

Referring now to FIGS. 2 and 8, an alternate embodiment of a method of manufacturing a heat exchanger of the present disclosure is presented. Specifically, a side (not shown in FIG. 2) is machined (block 800) to define the parallel flow network (not shown in FIG. 2), as hereinabove described. A cover (e.g. cover 300 in FIG. 3) is then brazed to the manifold 204, which is only partially machined at this point, block 802. In this way, the "higher risk" brazing operation is performed, and the integrity of the braze is confirmed, block 804.

In a subsequent step, block 806, side 206 of manifold 204 is prepared to receive receptacles 210, each of which is adapted to receive an element 202. Receptacles 210 are mounted or otherwise integrated with manifold 204, block 808. In parallel with the machining and brazing of manifold 204, individual micro-channel heat exchanger elements (e.g. element 210) are manufactured using substantially the same method described above, block 810. Each individual micro-channel heat exchanger element is individually tested or bench tested as well for thermal performance, block 812. By manufacturing and testing the micro-channel heat exchanger elements individually, costly scrap and rework of heat exchanger components or entire heat exchangers is avoided.

Once the manufacture of the micro-channel heat exchanger elements is complete (block 810) and the braze of a cover over the parallel flow network is completed (block 802), assembly may begin. As described above with respect to the embodiment of FIG. 6, heat exchanger elements, e.g. element 202, are mounted with receptacles 210 using mechanical fastening devices or other approaches well known in the art. O-rings or gaskets may first be to establish fluid tight seals, block 814. Locating pins (not shown) may be used to align and position element 202. The individual heat exchanger elements are attached to or within a corresponding receptacle mounted to the manifold, block 816.

In yet another embodiment (not shown in FIG. 8) of the present disclosure, the micro-channel heat exchanger elements, e.g. element 202, are first integrated with the receptacles 210, and each receptacle containing a micro-channel heat exchanger element is fastened to manifold 204. Fastening may include any of a number of techniques well known in the art, to include using mechanical fasteners or screws. Regardless of the sequencing for attaching elements and receptacles to the manifold, a final testing of the assembled heat exchanger 200 is performed to verify mechanical integrity, pressure drop and thermal performance, block 818.

As necessary, individual micro-channel heat exchanger elements may be removed from the manifold and replaced without destroying the integrity of the flow distribution system in the manifold or the integrity and functionality of surrounding elements. In this way, a cold plate of significant size (substantially larger than that disclosed in the prior art) can be manufactured, tested and employed.

It can be appreciated that the design and manufacturing methodology described in the present disclosure allows for cost effective, efficient integration of a heat exchanger with an electrical device or component. Heat exchanger 100 is typically positioned behind or in close proximity to the electrical components from which the heat is removed. Further, a multi-element heat exchanger on the order of two or more elements can be manufactured with a high degree of confidence in the end product. Finally, the ability to replace individual micro-channel heat exchanger elements, e.g. element 104, allows for timely and cost effective repair without the need to reject an entire heat exchanger 100.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall there between.

What is claimed is:

1. A method of manufacturing a heat exchanger, comprising:
    forming a first side of a manifold to define a plurality of individual pockets and a second side of the manifold to define a parallel flow network;
    fabricating a plurality of modular, interchangeable micro-channel heat exchanger elements, each modular, interchangeable micro-channel heat exchanger element comprising an individual front plate joined to an individual back plate such that each modular, interchangeable micro-channel heat exchanger element is discrete and individual, functioning independently from the plurality;
    securing a cover to the second side of the manifold; and
    integrating each modular, interchangeable micro-channel heat exchanger element of the plurality into respective individual pockets of the plurality of individual pockets defined in the first side of the manifold such that the modular, interchangeable micro-channel heat exchanger elements are accessible on the first side of the manifold for individual removal and replacement.

2. The method of claim 1, wherein securing the cover occurs prior to the integrating of the plurality of modular, interchangeable micro-channel heat exchanger elements.

3. The method of claim 1, wherein the integrating the plurality of modular, interchangeable micro-channel heat exchanger elements further comprises:
    placing at least one O-Ring, for each modular, interchangeable micro-channel heat exchanger element onto the first side of the manifold; and
    fastening each modular, interchangeable micro-channel heat exchanger element to the manifold, thereby compressing the at least one O-Ring between the first side of the manifold and the corresponding modular, interchangeable micro-channel heat exchanger element.

4. The method of claim 3, wherein the at least one O-Ring is fluorosilicone.

5. The method of claim 3, wherein fastening further comprises securing each modular, interchangeable micro-channel heat exchanger element to the manifold using at least one fastener interfacing with a spirallock thread in an aperture in the manifold.

6. The method of claim 1, further comprising using locating pins to orient and align each modular, interchangeable micro-channel heat exchanger element.

7. The method of claim 1, further comprising thermal testing at least one modular, interchangeable micro-channel heat exchanger element prior to integration.

\* \* \* \* \*